J. C. WILSON & J. E. QUICK.
SLUICE BOX.
APPLICATION FILED APR. 23, 1913.
1,085,516.
Patented Jan. 27, 1914.
2 SHEETS—SHEET 1.
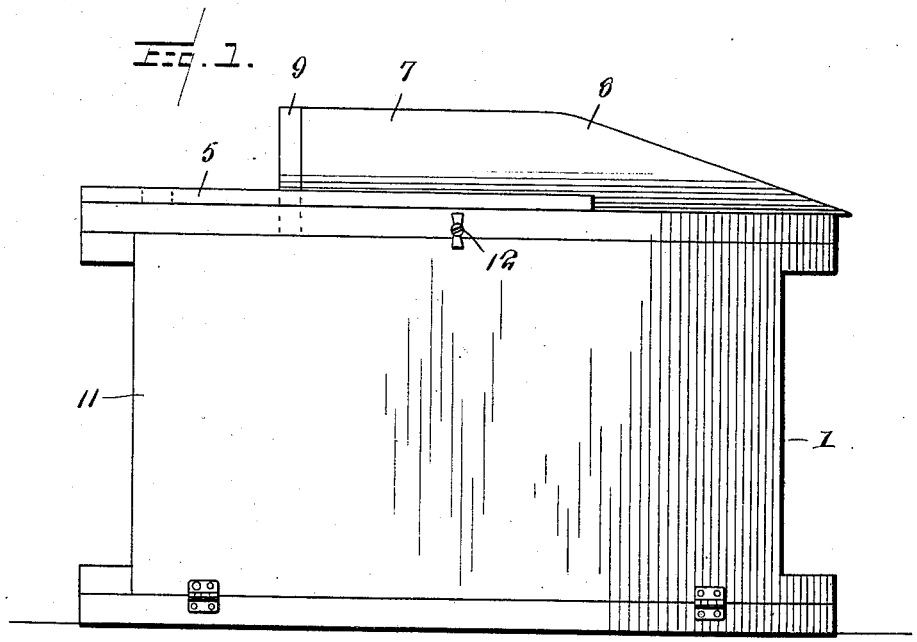
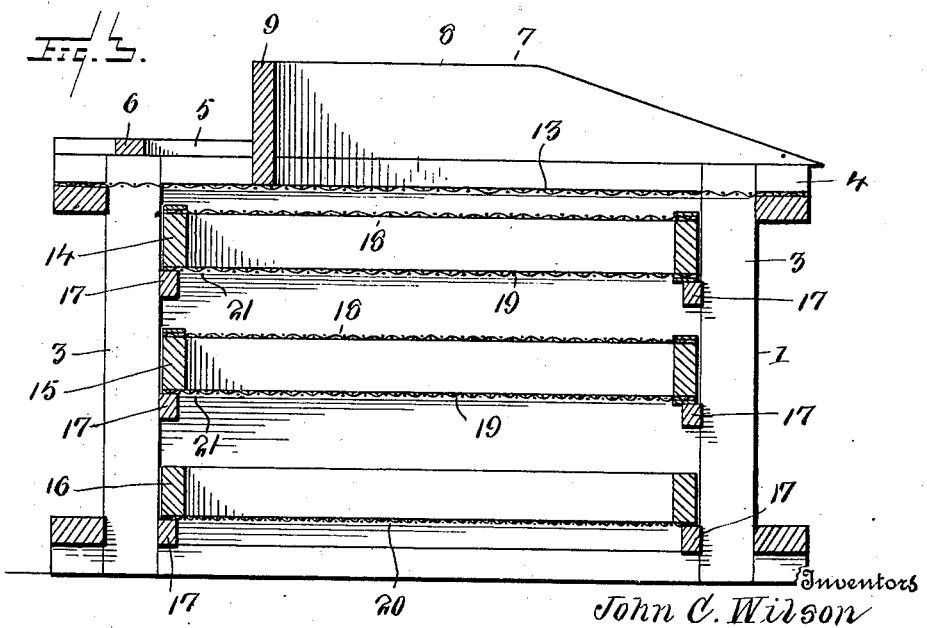
Witnesses
E. R. Ruppert
C. G. Hines
Inventors
John C. Wilson
John E. Quick
By Victor J. Evans
Attorney
COLUMBIA PLANOGRAPH CO., WASHINGTON, D. C.

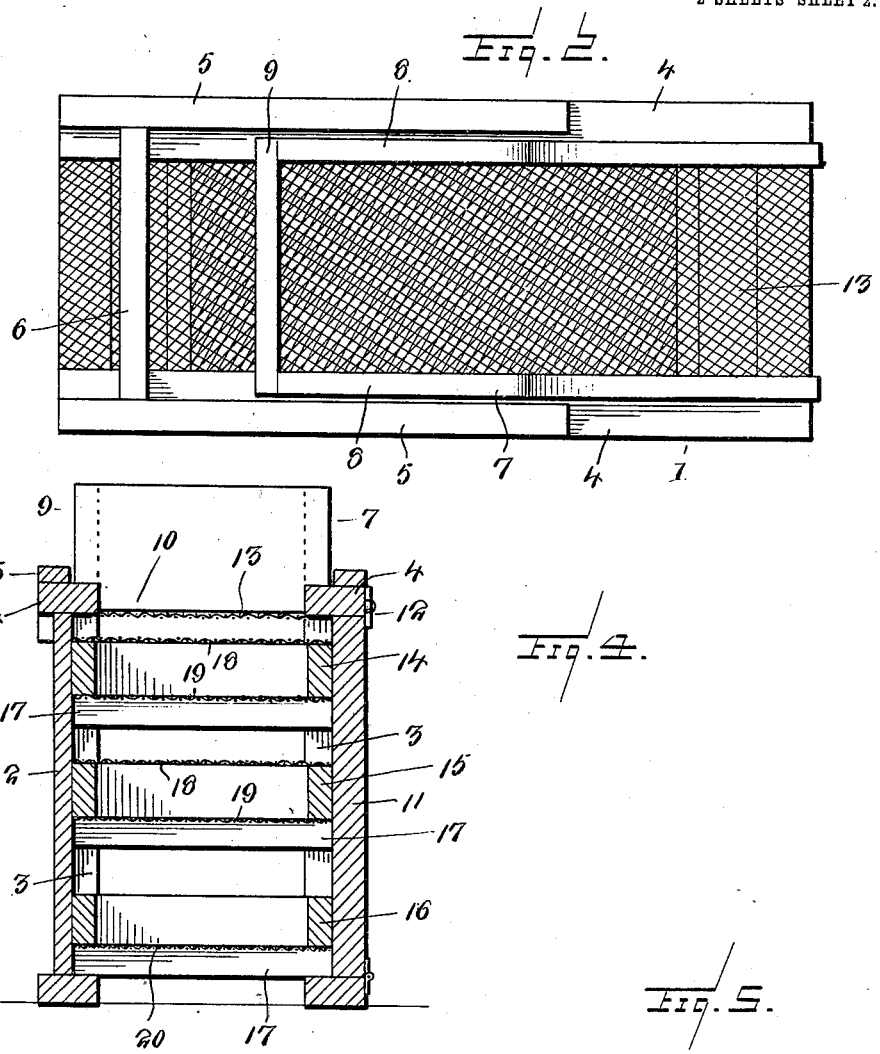

UNITED STATES PATENT OFFICE.

JOHN C. WILSON AND JOHN E. QUICK, OF COQUILLE, OREGON.

SLUICE-BOX.

1,085,516.      Specification of Letters Patent.      Patented Jan. 27, 1914.

Application filed April 23, 1913. Serial No. 763,092.

*To all whom it may concern:*

Be it known that we, JOHN C. WILSON and JOHN E. QUICK, citizens of the United States, residing at Coquille, in the county of Coos and State of Oregon, have invented new and useful Improvements in Sluice-Boxes, of which the following is a specification.

This invention relates to sluice boxes particularly designed for use in separating free gold and platinum from black sand and placer and gravel, the object of the invention being to provide a simple, efficient and inexpensive device of this character whereby both coarse and fine particles of gold and platinum may be caught and retained.

A further object of the invention is to provide a sluice box in which the particles of metal will be securely held from escape and in which the separating screens are arranged in the form of drawers which are readily removable from the box without interference from each other.

The invention consists of the features of construction, combination and arrangement of parts hereinafter fully described and claimed, reference being had to the accompanying drawings, in which:—

Figure 1 is a front elevation of a sluice box constructed in accordance with the invention. Fig. 2 is a top plan view of the same. Fig. 3 is a vertical longitudinal section. Fig. 4 is a vertical transverse section. Fig. 5 is a perspective view of one of the duplex screens.

In carrying our invention into practice, we provide an oblong rectangular box or casing 1, which is preferably open at the bottom, top and ends, and provided at one side with a fixed wall 2. The frame of the box includes corner posts 3 and longitudinal top bars 4 to which are secured retaining strips 5 and a transverse stop bar 6. A guide trough 7 rests and is adjustably mounted upon the bars 4 between the strips 5 and is limited in movement in one direction by the stop bar 6. This trough includes side walls 8 and a connecting end wall 9, the latter having a reduced portion 10 fitting down between the bars 4 to coöperate with the strips 5 in holding the trough against lateral displacement. The trough is designed to receive and deflect the sand and water down into the sluice box. A wall 11 is provided at the side opposite the fixed wall 2, and is preferably in the form of a hinged door, adapted to be let down to a horizontal position to permit access to the trough and to be secured in closed position by a suitable catch or latch device 12.

Secured across the top of the sluice box is a primary screen 13, of comparatively coarse mesh, whereby all foreign particles of excessive size are retained and prevented from passing through the box. Below this screen 13 is arranged a series of screens 14, 15 and 16, each of which screens is constructed in the form of a drawer and comprises a frame having a filling of screen material. The screen frames rest upon suitable strips or ledges 17, whereby they may be inserted and removed through the doorway when the door or letdown end wall 11 is opened. The screen members 14 and 15 are provided with top and bottom layers 18 and 19 of screen material, while the screen 16 is provided with a single bottom screen layer 20, and the frame of this screen 16 forms a final tray or receptacle in which the finer particles of sand, gold and platinum are confined and retained. The successive screen layers of the screen sections 14, 15 and 16 are of progressively increasing fineness of mesh, so that the several screen layers will catch and retain particles of graduated sizes, as will be readily understood, in the screening of the sand passing downward through the sluice box, the sand being agitated by the flowing water as in ordinary devices of this character. In order to permit removal of the particles caught by the lower screen layers 19 of the screen members 14 and 15, each of said layers is provided with a free end portion 21, which is held against the screen frame and in closed position against the escape of the material, when the screen drawer is in position in the sluice box, by the weight of the screen drawer upon the adjacent ledge 17. When the screen drawer is removed, the free portion 21 of the layer 19 may be pulled down, allowing the gathered material to be shaken or washed out.

In the operation of the device, it will be understood that the sand passing downward through the box, and washed and agitated by the flowing water, will be separated, together with the free gold and platinum carried thereby, according to the degrees of fineness thereof by the respective screens, the finest particles being caught in the lower screen section 16. After each operation, or at proper periods, the door 11 may be opened and the interior screen sections removed in order to enable the metal to be gathered.

It will be understood, of course, that the adjustable and removable trough 7 permits of the distribution of the material across the screen 13 as occasion may require, and of the removal of the screened material from said screen 13 at desired intervals without interference, while the mode of mounting the interior screens also permits of their independent removal without interference from each other, the advantages of which will be appreciated.

We claim:—

1. In a device of the character described, a screen comprising a rectangular frame having an upper fixed screen layer and a lower screen layer, the latter being provided with a free end portion.

2. In a device of the character described, a screen comprising a rectangular frame, an upper screen section fixed at all points to said frame, and a lower screen section fixed at all points except at one end to said frame, the loose ends of the lower screen section forming a flap affording communication to the space between said screen sections.

In testimony whereof we affix our signatures in presence of two witnesses.

JOHN C. WILSON.
JOHN E. QUICK.

Witnesses:
R. H. SMITH,
M. E. MILLER.

Copies of this patent may be obtained for five cents each, by addressing the "Commissioner of Patents, Washington, D. C."